United States Patent
Li

(10) Patent No.: US 8,625,258 B2
(45) Date of Patent: Jan. 7, 2014

(54) MOUNTING APPARATUS FOR EXPANSION CARD

(75) Inventor: Zhan-Yang Li, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 605 days.

(21) Appl. No.: 12/955,927

(22) Filed: Nov. 30, 2010

(65) Prior Publication Data

US 2011/0317342 A1    Dec. 29, 2011

(51) Int. Cl.
  *H05K 5/00*    (2006.01)
(52) U.S. Cl.
  USPC ..................................... 361/679.01; 181/207
(58) Field of Classification Search
  USPC ..................................... 361/679.01; 181/207
  See application file for complete search history.

(56) References Cited

U.S. PATENT DOCUMENTS

| | | | | |
|---|---|---|---|---|
| 4,066,058 | A * | 1/1978 | Anderkay | 123/198 E |
| 6,786,298 | B1 * | 9/2004 | Chang et al. | 181/207 |
| 2001/0037911 | A1 * | 11/2001 | Stanienda | 181/207 |
| 2009/0242322 | A1 * | 10/2009 | Tsai | 181/207 |
| 2011/0228451 | A1 * | 9/2011 | Chiu | 361/679.01 |
| 2011/0304960 | A1 * | 12/2011 | Lu | 361/679.01 |

* cited by examiner

*Primary Examiner* — Forrest M Phillips
(74) *Attorney, Agent, or Firm* — Altis Law Group, Inc.

(57) ABSTRACT

A mounting apparatus includes a mounting bracket and a securing element. The mounting bracket is configured to mount an expansion card. The mounting bracket is mounted in a chassis. The securing element includes a positioning member mounted to the mounting bracket, a mounting member mounted in the positioning member, and an elastic member surrounding the mounting member. The positioning member includes a first stopping portion. The mounting member includes a contact portion and a threaded portion engaging the chassis. The elastic member is resiliently compressed between the first stopping portion and the contact portion. The elastic member is configured to bias the threaded portion away from the chassis.

16 Claims, 5 Drawing Sheets

MOUNTING APPARATUS FOR EXPANSION CARD

BACKGROUND

1. Technical Field

The present disclosure relates to mounting apparatuses, and particularly to a mounting apparatus for securing expansion cards in an electronic device.

2. Description of Related Art

A computer system usually includes expansion cards, such as sound cards, video cards, graphics cards and so on, for enhancing capabilities of the computer system. Often, an expansion card is coupled to a riser card, and one end of the expansion card is secured to a rear wall of the computer system enclosure. However, some expansion cards are longer than others. If the longer expansion cards are secured to the computer enclosure as described, they will be unstable.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
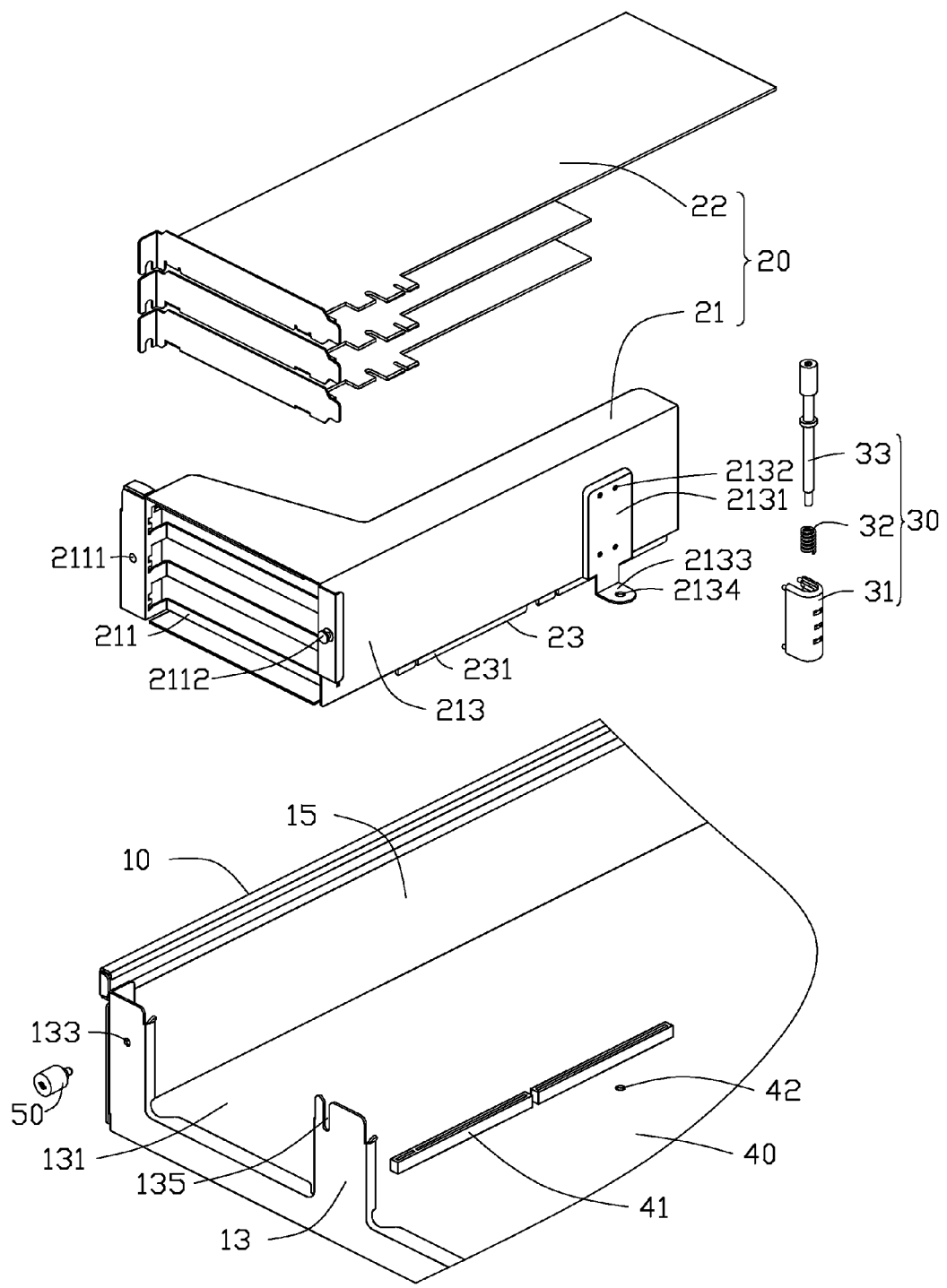
FIG. 1 is an exploded, isometric view of a mounting apparatus for an expansion card in accordance with an embodiment, the mounting apparatus including a securing element.
Figure 2:
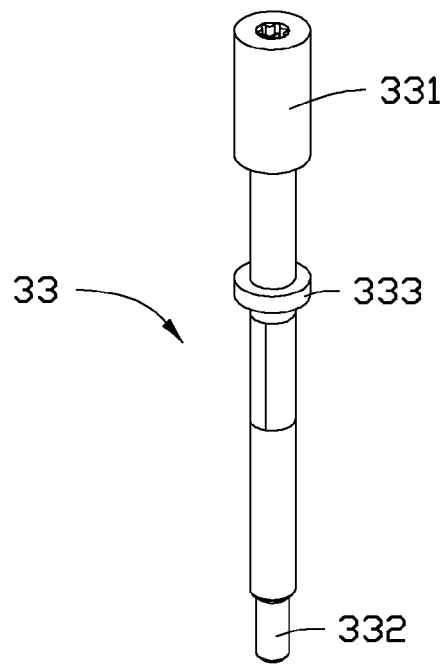
FIG. 2 is an exploded, isometric view of the securing element of FIG. 1.
Figure 2:
Figure 2:
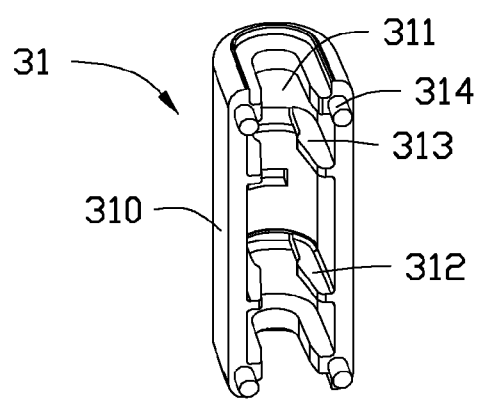
Figure 3:
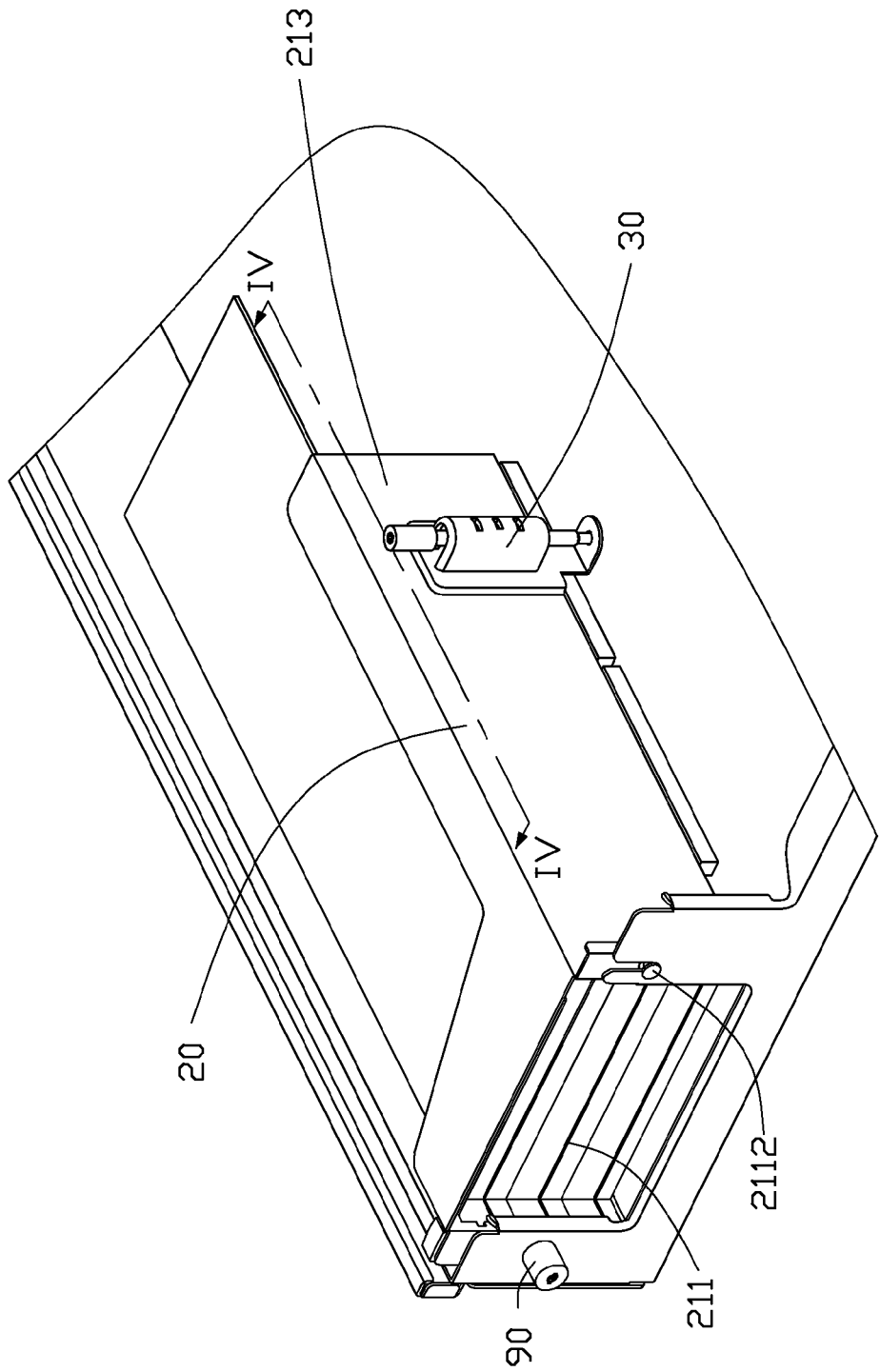
FIG. 3 is a pre-assembly view of FIG. 1.
Figure 4:
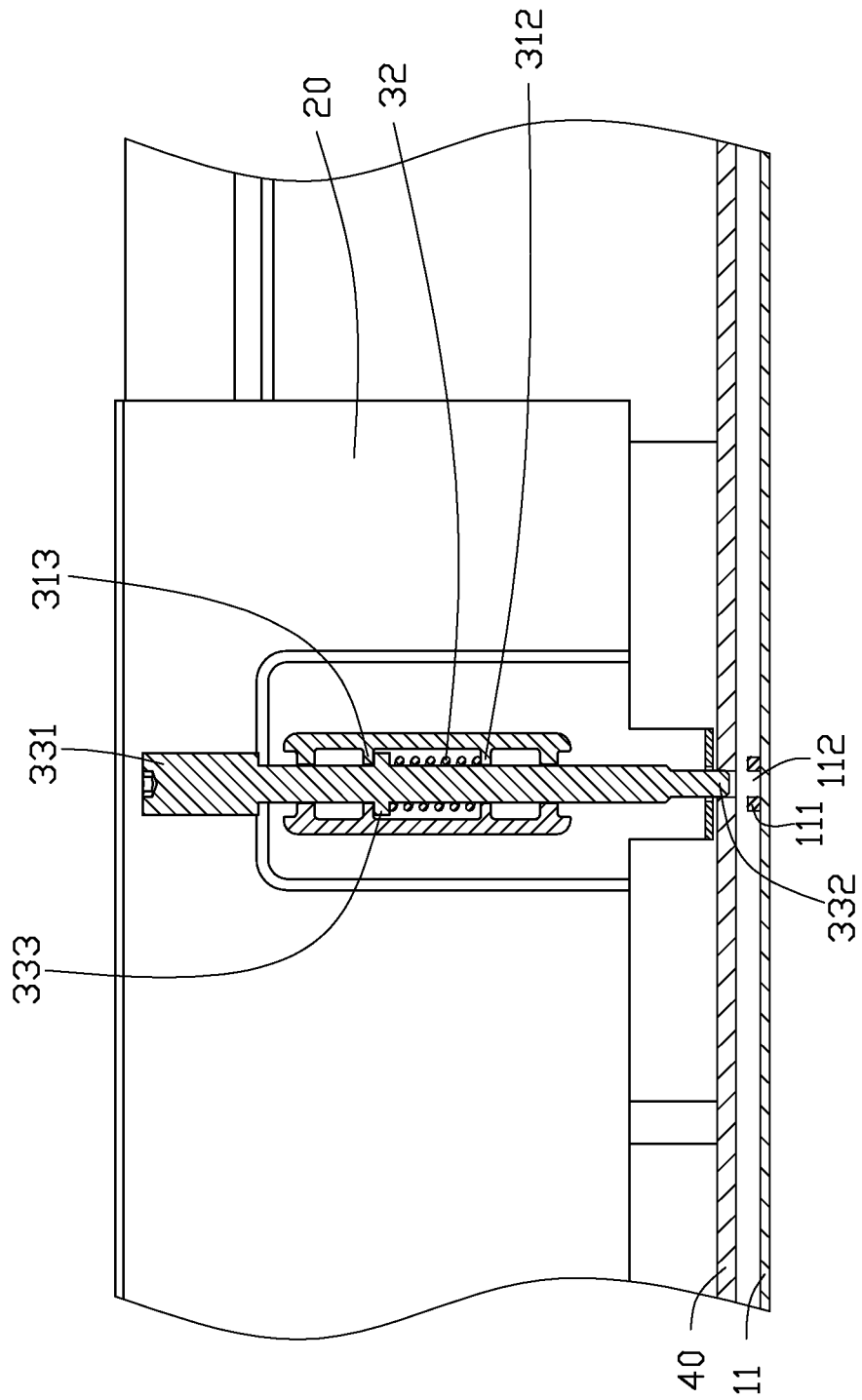
FIG. 4 is a cross section of FIG. 3, taken along line IV-IV.
Figure 5:
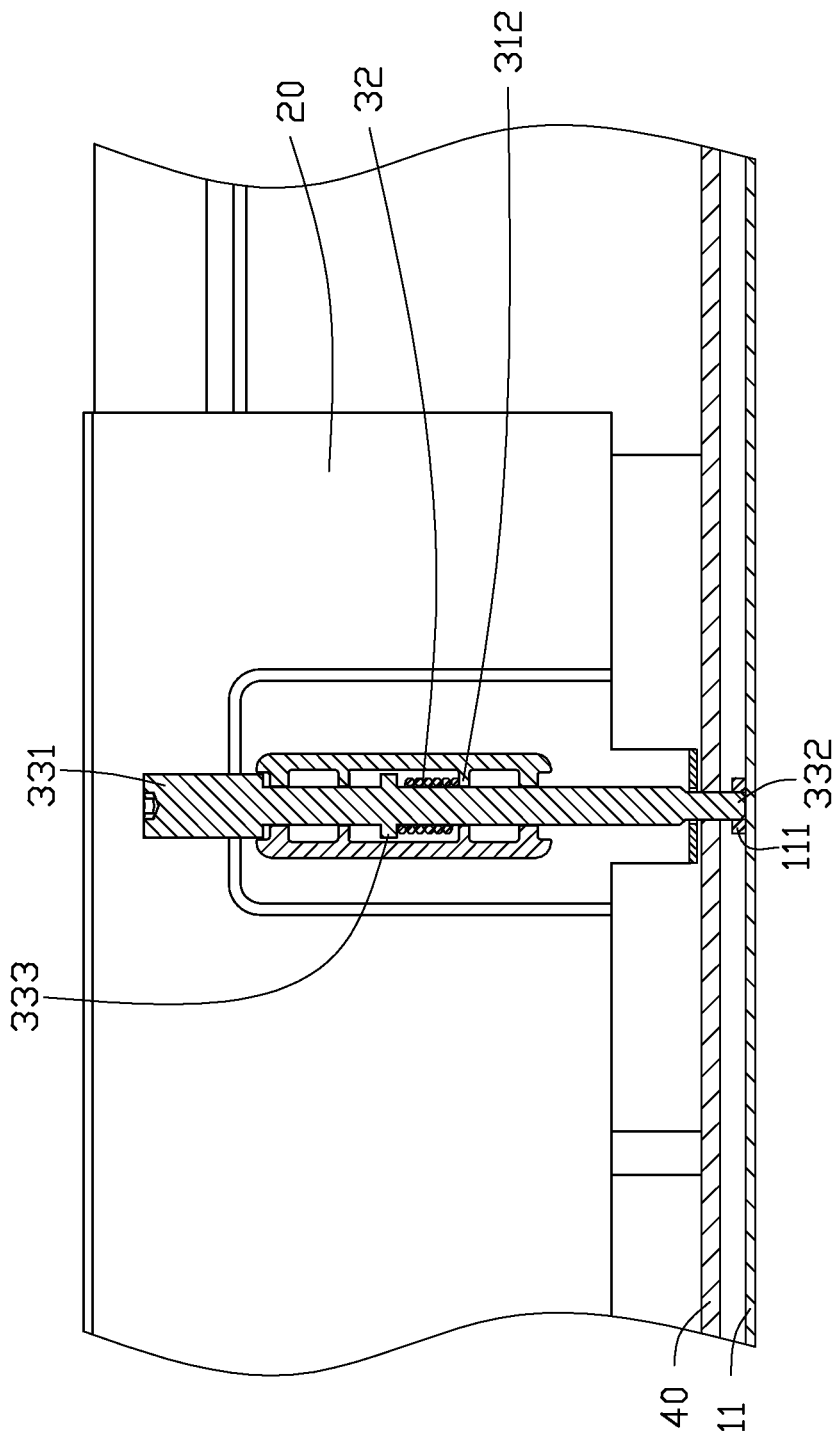
FIG. 5 is a cross section of the mounting apparatus being assembled.

Referring to FIGS. 1 to 3, a mounting apparatus includes a chassis 10, a mounting bracket 21 of an expansion card module 20, and a securing element 30.

The chassis 10 includes a bottom plate 11, a rear plate 13 extending perpendicularly from the bottom plate 11, and a side plate 15 extending perpendicularly from the bottom plate 11. The bottom plate 11 is configured to mount a printed circuit board 40. The bottom plate 11 includes a securing portion 111. A securing hole 112 is defined in the securing portion 111. A mounting opening 131 is defined in the rear plate 13. A first mounting hole 133 and a slot 135 are defined in two opposite sides of the mounting opening 131. An inserting slot 41 and a through hole 42 are defined in the printed circuit board 40. The through hole 42 corresponds to the securing hole 112.

The expansion card module 20 includes a plurality of expansion cards 22 mounted in the mounting bracket 21. The mounting bracket 21 includes a rear panel 211 and a side panel 213. A converter card 23 is mounted on the side panel 213. The converter card 23 includes an inserting terminal 231 corresponding to the inserting slot 41 of the printed circuit board 40. A second mounting hole 2111 is defined in the rear panel 211 corresponding to the first mounting hole 133 of the rear plate 13 of the chassis 10. The rear panel 211 includes a protrusion 2112 corresponding to the slot 135 of the rear plate 13. The side panel 213 includes mounting portion 2131. A plurality of third mounting holes 2132 is defined in the mounting portion 2131. The mounting portion 2131 includes a bent tab 2133, and a through hole 2134 is defined in the bent tab 2133.

The securing element 30 includes a positioning member 31, an elastic member 32, and a mounting member 33. A through hole 311 is defined in the positioning member 31. The positioning member 31 includes a main body 310, a first stopping portion 312 and a second stopping portion 313 in an inner side of the main body 310. The main body 310 is U-shaped. The positioning member 31 also includes a plurality of mounting protrusions 314 extending from the main body 310. In one embodiment, the elastic member 32 is a spring. The mounting member 33 includes a handling portion 331, a threaded portion 332, and a contact portion 333. The contact portion 333 is disposed between the threaded portion 332 and the handling portion 331.

Referring to FIGS. 1 through 5, during assembly of the securing element 30 to the mounting bracket 21, the elastic member 32 surrounds the mounting member 33. The elastic member 32 is disposed between the contact portion 333 and the first stopping portion 312. The contact portion 333 abuts the second stopping portion 313 of the positioning member 31.

In assembly of the mounting apparatus, the expansion cards 22 are received in the mounting bracket 21. The expansion card module 20 is aligned with the mounting opening 131 of the rear plate 13. The protrusion 2112 is disposed in the slot 135 of the rear plate 13. The first mounting hole 133 is aligned with the second mounting hole 2111 of the rear panel 211. A fastener 50 extends into the first and second mounting holes 133, 2111 to secure the mounting bracket 21 to the rear plate 13. The threaded portion 332 of the mounting member 33 is aligned with the through hole 42 of the printed circuit board 40 and the securing hole 112 of the bottom plate 11. When the threaded portion 332 of the mounting member 33 reaches the securing hole 112 of the bottom plate 11, the handling portion 331 of the mounting member 33 is rotated to enable the threaded portion 332 to extend into the securing hole 112, thereby securing the mounting bracket 21 to the bottom plate 11. At this time, the elastic member 32 is resiliently compressed between the first stopping portion 312 and the contact portion 333.

During disassembly, the fastener 50 is removed from the first mounting hole 133 to enable the mounting bracket 21 to separate from the rear plate 13. The threaded portion 332 of the mounting member 33 is separated from the securing hole 112 to enable the mounting bracket 21 to separate from the bottom plate 11. At this time, the elastic member 32 is released to enable the contact portion 333 to block the second stopping portion 313. The expansion card module 20 is moved upward to be separated from the chassis 10.

It is to be understood, however, that even though numerous characteristics and advantages have been set forth in the foregoing description of embodiments, together with details of the structures and functions of the embodiments, the disclosure is illustrative only and changes may be made in detail, especially in matters of shape, size, and arrangement of parts within the principles of the disclosure to the full extent indicated by the broad general meaning of the terms in which the appended claims are expressed.

What is claimed is:

1. A mounting apparatus comprising:
a mounting bracket configured to mount an expansion card, the mounting bracket configured to be mounted in a chassis; and
a securing element, the securing element comprising a positioning member mounted to a mounting bracket, a mounting member mounted in the positioning member, and an elastic member surrounding the mounting member; the positioning member comprising a main body, a first stopping portion and a second stopping portion; the first stopping portion and the second stopping portion extending from an inner side of the main body; the mounting member comprising a contact portion and a threaded portion configured to engage the chassis; the contact portion resisting the second stopping portion and located between the first stopping portion and the second stopping portion; the elastic member resiliently compressed between the first stopping portion and the contact portion; and the elastic member configured to bias the threaded portion away from the chassis.

2. The securing element of claim 1, wherein the main body is U-shaped.

3. The mounting apparatus of claim 1, wherein a through hole is defined in the mounting bracket, the through hole corresponds to the threaded portion, and the threaded portion is configured to extend through the through hole to engage the chassis.

4. The mounting apparatus of claim 1, wherein the mounting member comprises a handling portion; and the handling portion is configured to be rotated to enable the threaded portion to engage the chassis.

5. The mounting apparatus of claim 1, wherein the positioning member comprises a mounting protrusion, and a mounting hole is defined in the mounting bracket corresponding to the mounting protrusion.

6. An electronic device, comprising:
a chassis, the chassis comprising a bottom plate;
a mounting bracket, the mounting bracket configured to mount an expansion card and the mounting bracket mounted on the bottom plate; and
a securing element; the securing element comprising a positioning member mounted to the mounting bracket, a mounting member mounted in the positioning member, and an elastic member surrounding the mounting member; the positioning member comprising a main body, a first stopping portion, and a second stopping portion; the mounting member comprising a contact portion, and the mounting member engages the bottom plate; the first stopping portion and the second stopping portion extending from an inner side of the main body; the contact portion located between the first stopping portion and the second stopping portion; the elastic member is resiliently compressed between the first stopping portion and the contact portion; and the elastic member configured to bias the mounting member away from the bottom plate.

7. The electronic device of claim 6, wherein the mounting member further comprises a threaded portion, and a securing hole, defined in the bottom plate, engages the threaded portion.

8. The electronic device of claim 7, wherein a through hole is defined in the mounting bracket, the through hole corresponds to the securing hole, and the threaded portion extends through the through hole to engage the securing hole.

9. The electronic device of claim 7, wherein the mounting member comprises a handling portion; and the handling portion is configured to be rotated to enable the threaded portion to engage the securing hole.

10. The electronic device of claim 7, further comprising a printed circuit board, wherein the expansion card is connected to the printed circuit board; and a through hole is defined in the printed circuit board, and the threaded portion extends through the through hole to engage the securing hole.

11. The securing element of claim 6, wherein the main body is U-shaped.

12. The electronic device of claim 6, wherein the positioning member comprises a mounting protrusion, and a mounting hole is defined in the mounting bracket corresponding to the mounting protrusion.

13. The electronic device of claim 6, wherein the chassis further comprises a rear plate substantially perpendicular to the bottom plate, and a fastener securing the mounting bracket to the rear plate along a direction substantially perpendicular to the rear plate.

14. A securing element, comprising:
a positioning member configured to be mounted to a mounting bracket, the positioning member comprising a main body, a first stopping portion, and a second stopping portion; and the first stopping portion and the second stopping portion extending from an inner side of the main body;
a mounting member mounted in the positioning member, the mounting member comprising a contact portion and a threaded portion configured to engage a chassis to secure the mounting bracket to the chassis, and the contact portion contacting the second stopping portion and located between the first stopping portion and the second stopping portion; and
an elastic member surrounding the mounting member; the elastic member resiliently compressed between the first stopping portion and the contact portion; and the elastic member configured to bias the threaded portion away from the chassis.

15. The securing element of claim 14, wherein the mounting member comprises a handling portion; and the handling portion is configured to be rotated to enable the threaded portion to engage the chassis.

16. The securing element of claim 14, wherein the main body is U-shaped.

* * * * *